(12) United States Patent
Kapparos et al.

(10) Patent No.: US 8,091,346 B2
(45) Date of Patent: Jan. 10, 2012

(54) METHOD FOR MODIFYING AIR PROVIDED FOR REGENERATION

(75) Inventors: David Joseph Kapparos, Chillicothe, IL (US); Glenn Brian Cox, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 636 days.

(21) Appl. No.: 12/175,060

(22) Filed: Jul. 17, 2008

(65) Prior Publication Data

US 2010/0011747 A1 Jan. 21, 2010

(51) Int. Cl.
*F01N 3/025* (2006.01)
(52) U.S. Cl. ............................. 60/295; 60/286; 60/303
(58) Field of Classification Search .................. 60/286, 60/290, 295, 303
See application file for complete search history.

(56) References Cited

U.S. PATENT DOCUMENTS

| | | | |
|---|---|---|---|
| 4,359,134 A | 11/1982 | Jackson | |
| 4,936,093 A * | 6/1990 | Goerlich | 60/280 |
| 5,456,079 A | 10/1995 | Langen | |
| 5,634,330 A * | 6/1997 | Achleitner et al. | 60/274 |
| 6,594,990 B2 | 7/2003 | Kuenstler et al. | |
| 6,865,883 B2 | 3/2005 | Gomulka | |
| 6,969,413 B2 | 11/2005 | Yahata et al. | |
| 7,237,379 B2 | 7/2007 | Nakano et al. | |
| 7,251,557 B2 * | 7/2007 | Strom et al. | 701/114 |
| 7,322,183 B2 | 1/2008 | Sisken et al. | |
| 2006/0130460 A1 | 6/2006 | Warner | |
| 2006/0218897 A1 * | 10/2006 | Sisken et al. | 60/284 |
| 2007/0044453 A1 | 3/2007 | Strauser et al. | |
| 2007/0251216 A1 | 11/2007 | Easley, Jr. et al. | |
| 2008/0034736 A1 | 2/2008 | Chiba et al. | |
| 2008/0078167 A1 | 4/2008 | Wang et al. | |
| 2008/0271447 A1 * | 11/2008 | Abel et al. | 60/598 |

FOREIGN PATENT DOCUMENTS

| | | | |
|---|---|---|---|
| EP | 0744536 | | 11/1996 |
| JP | 2005299513 A | * | 10/2005 |
| WO | 9632572 | | 10/1996 |

* cited by examiner

*Primary Examiner* — Thomas Denion
*Assistant Examiner* — Jonathan Matthias
(74) *Attorney, Agent, or Firm* — Finnegan, Henderson, Farabow, Garrett & Dunner LLP

(57) ABSTRACT

A method for regenerating a filtering device is disclosed. The method may include creating a flow of exhaust with a power source and providing air to a combustion device configured to heat the flow of exhaust. The method may also include determining if a parameter is above a threshold. The parameter may be indicative of an amount of air provided to the combustion device. The method may further include modifying an operating condition of the power source if the parameter is above the threshold, where modifying the operating condition affects the parameter.

18 Claims, 3 Drawing Sheets

METHOD FOR MODIFYING AIR PROVIDED FOR REGENERATION

TECHNICAL FIELD

The present disclosure relates generally to a method of regenerating a filtering device and, more particularly, to a method for modifying air provided to combustion device for regeneration of a filtering device.

BACKGROUND

Conventional diesel powered systems for engines, factories, and power plants produce emissions that contain a variety of pollutants. These pollutants may include, for example, particulate matter (e.g., soot), nitrogen oxides (NOx) such as NO and $NO_2$, and sulfur compounds. Due to heightened environmental concerns, diesel powered engine exhaust emission standards have become increasingly stringent. The amount of pollutants in the flow of exhaust may be regulated depending on the type, size, and/or class of engine.

One method implemented by engine manufacturers to comply with the regulation of particulate matter exhausted to the environment has been to remove the particulate matter from the exhaust flow of an engine with a device called a particulate trap or diesel particulate filter (DPF). A DPF is a filter designed to trap particulate matter and typically consists of a wire mesh or ceramic honeycomb medium. However, the use of the DPF for extended periods of time may cause the particulate matter to build up in the medium, thereby reducing the functionality of the DPF and subsequent engine performance.

The collected particulate matter may be removed from the DPF through a process called regeneration. The regeneration process may involve elevating the temperature of the flow of exhaust to a high temperature using, for example, a burner or other heating device. The heated flow of exhaust may pass through the DPF, thus oxidizing the particulate matter trapped within the DPF. To achieve good regeneration results with a burner, sufficient air must be provided to the burner to achieve an acceptable equivalence ratio (equivalence ratio equals the actual fuel air ratio divided by the fuel air ratio required for stoichiometric combustion). As the amount of air relative to the amount of fuel increases, the equivalence ratio decreases.

One device for controlling combustion air input to a burner is described in U.S. Pat. No. 5,456,079 (the '079 patent) issued to Langen on Oct. 10, 1995. Specifically, the '079 patent discloses a device for thermal regeneration of particulate filters including a burner and a combustion air supply. The means for supplying combustion air to the burner preferably comprises a compressor or air pump or blower, respectively, that delivers a combustion air quantity per unit time that is dependent on the speed of the diesel engine (e.g., the quantity of combustion air per unit time is at least roughly matched to the speed of the diesel engine). The compressor may be driven mechanically by the diesel engine.

The '079 patent also discloses that there are regeneration situations in which it is advantageous for the '079 system not to be bound to the strict dependency of the combustion air quantity delivered by the compressor on the speed of the diesel engine. For taking such situations into account, a controllable valve is preferably provided between the compressor and the burner for controlling the combustion air quantity fed to the burner per unit of time.

Although the thermal regeneration device of the '079 patent may control combustion air input to a burner for regeneration, it may not achieve an acceptable equivalence ratio under some conditions, which may result in suboptimal regeneration results.

The disclosed systems and methods are directed to overcoming one or more of the problems set forth above and/or other problems in the art.

SUMMARY OF THE DISCLOSURE

In one aspect, the present disclosure is directed to a method of regenerating a filtering device. The method may include creating a flow of exhaust with a power source and providing air to a combustion device configured to heat the flow of exhaust. The method may also include determining if a parameter is above a threshold. The parameter may be indicative of an amount of air provided to the combustion device. The method may further include modifying an operating condition of the power source if the parameter is above the threshold, where modifying the operating condition affects the parameter.

In another aspect, the present disclosure is directed to an emissions control system having a filtering device. The emissions control system may include a first passageway configured to receive an exhaust flow from a power source. The emissions control system may also include a second passageway having an input in fluid communication with a source of air. The emissions control system may further include a combustion device configured to heat the exhaust flow in the first passageway. The combustion device may be configured to receive air from the second passageway. The emissions control system may also include a controller. The controller may be configured to calculate if a parameter is above a threshold. The parameter may be indicative of an amount of air provided to the combustion device. The controller may also be configured to modify an operating condition of the power source if the parameter is above the threshold, where modifying the operating condition affects the amount of air provided to the combustion device.

DETAILED DESCRIPTION

Figure 1:
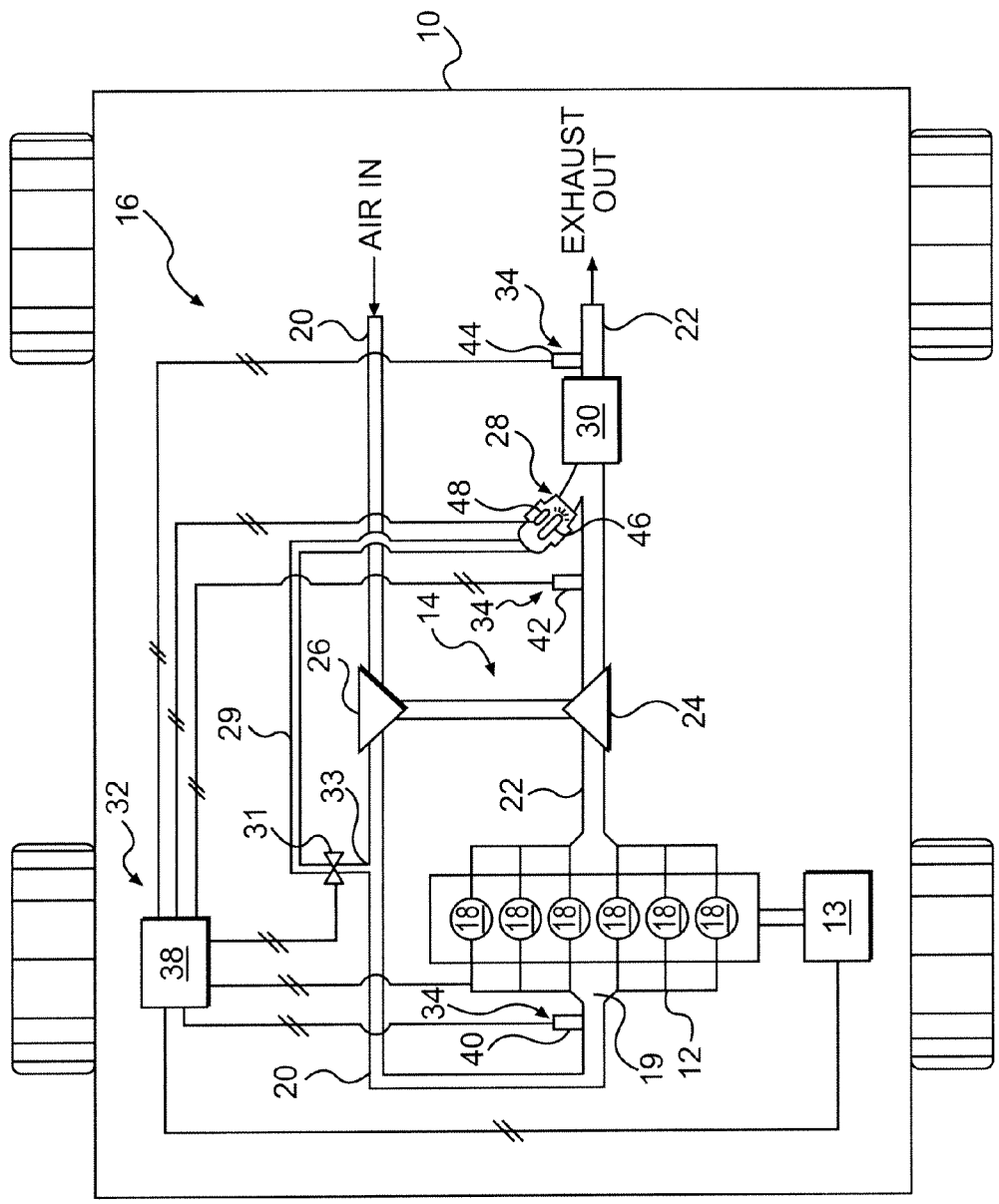
FIG. 1 is a diagrammatic illustration of an exemplary disclosed machine including an emissions control system.

FIG. 1 illustrates an exemplary machine 10 having multiple systems and components that cooperate to accomplish a task. The tasks performed by machine 10 may be associated with a particular industry such as mining, construction, farming, transportation, power generation, or any other industry known in the art. For example, machine 10 may embody a mobile machine such as, a wheel loader, an excavator, a haul truck, a locomotive, a marine vessel, or any other type of mobile machine known in the art. Machine 10 may also embody a stationary machine, such as, for example, a power generation machine. As shown in FIG. 1, machine 10 may include a power source 12, a turbocharger 14, and an emissions control system 16.

Power source 12 may embody a combustion engine, such as, for example, a diesel engine, a gasoline engine, a gaseous fuel-powered engine (e.g., a natural gas engine), or any other type of combustion engine known to one skilled in the art. Power source 12 may receive air via an intake passageway 20 connected to an intake manifold 19. Power source 12 may have a plurality of combustion chambers 18 that convert potential chemical energy (usually in the form of a combustible gas mixed with air) into useful output power, such as, for example, mechanical work. At least a portion of the output power created by power source 12 may be directed to drive or operate a parasitic device 13.

Parasitic device 13 may be a device powered by power source 12, the operation of which may place a load on power source 12. Parasitic device 13 may perform useful operations and functions associated with machine 10. For example, parasitic device 13 may embody an air conditioning system, a torque converter, a hydraulic fan, a hydraulic pump, or any other parasitic device known in the art. Parasitic device 13 may be driven by power source 12 using a direct crankshaft connection, a driveshaft, a gear train, a hydraulic circuit, an electrical circuit, or in any other appropriate manner. It is contemplated that machine 10 may have multiple parasitic devices 13.

In addition to creating useful output power, power source 12 may also output a flow of exhaust. The flow of exhaust may contain a mixture of gaseous compounds and solid particulate matter and may be communicated to the atmosphere via an exhaust passageway 22. As the flow of exhaust passes through exhaust passageway 22, it may pass through and help drive turbocharger 14.

Turbocharger 14 may include a turbine 24 and a compressor 26. As the flow of exhaust exits power source 12, it may pass through one or more blades of turbine 24 (not shown) causing turbine 24 to rotate. Turbine 24 may be connected to and drive compressor 26. Compressor 26 may compress the air flowing through intake passageway 20. Compressor 26 may embody a fixed geometry compressor, a variable geometry compressor, or any other type of compressor known in the art. It is contemplated that turbine 24 may be omitted and compressor 26 may be driven by power source 12 mechanically, hydraulically, electrically, or in any other manner known in the art. It is also contemplated that turbocharger 14 may alternatively include multiple turbines 24 and compressors 26. The multiple turbines 24 and compressors 26 may be arranged in a series or parallel configuration.

Emissions control system 16 may reduce emissions of harmful gasses and particulate matter emitted from power source 12 after a combustion process. Emissions control system 16 may include a combustion device 28, a passageway 29, a filtering device 30, a valve 31, and a control system 32. It is contemplated that emissions control system 16 may include other components, such as, for example a diesel oxidation catalyst, a selective catalytic reduction device, a NOx trap, and other emissions control devices known in the art.

Combustion device 28 may embody, for example, a fuel-fired burner. Combustion device 28 may inject fuel and ignite the injected fuel in order to create a combustion event and heat filtering device 30. Combustion device 28 may utilize any appropriate fuel, such as, for example, gasoline, diesel fuel, gaseous fuels (e.g., natural gas, butane, propane), or any other type of fuel known in the art. Combustion device 28 may include a fuel injector 46 and an ignition source 48. It is contemplated that one or more sensors (not shown) may be associated with fuel injector 46 to determine the pressure, flow rate, and/or other characteristic of the injected fuel. Combustion device 28 may be connected to a fuel source (not shown) and a source of air (e.g., passageway 29).

Passageway 29 may connect intake passageway 20 to combustion device 28 and may provide air for operation of combustion device 28. In one embodiment, an inlet 33 of passageway 29 may be located downstream of compressor 26, and thus, the air conveyed in passageway 29 may be pressurized above ambient pressure.

Valve 31 may be located in passageway 29 and configured to regulate the flow of compressed air to combustion device 28. Valve 31 may embody a butterfly valve, a gate valve, a ball valve, a globe valve, or any other type of valve known in the art. Valve 31 may be solenoid-actuated, hydraulically-actuated, pneumatically-actuated, or actuated in any other manner.

Filtering device 30 may be a wall-flow or flow-through device configured to filter particulate matter, soot, and/or chemicals from the flow of exhaust before the flow is released into the atmosphere via exhaust passageway 22. Filtering device 30 may embody, for example, a diesel particulate filter (DPF), a catalyzed diesel particulate filter (CDPF) or a diesel oxidation catalyst followed by a DPF. Filtering device 30 may contain filtering elements (not shown), arranged in a honeycomb, mesh, and/or other suitable configuration.

Control system 32 may be configured to aid in the reduction of particulate matter and pollutants emitted from power source 12. Specifically, control system 32 may control regeneration of filtering device 30. Control system 32 may include a one or more sensors 34 and a controller 38.

Sensors 34 of control system 32 may include a first sensor 40, a second sensor 42, and a third sensor 44. First sensor 40 may be configured to measure a pressure of the intake air at or upstream of intake manifold 19 but downstream of compressor 26. First sensor 40 may sense the pressure of intake air after it has been compressed (or boosted) by compressor 26. Second sensor 42 may be configured to measure a pressure of the flow of exhaust at or upstream of filtering device 30 but downstream of power source 12. Third sensor 44 may be configured to measure a pressure of the flow of exhaust downstream of filtering device 30. The pressure measured by third sensor 44 may be at or close to ambient pressure. It is contemplated that the pressures measured by second sensor 42 and third sensor 44 may be used by controller 38 to help determine if filtering device 30 requires regeneration. In other words, as filtering device 30 becomes clogged with particulate matter, the pressure drop measured between second sensor 42 and third sensor 44 may increase and may exceed a threshold level. Each of sensors 34 may embody a strain gauge, a semiconductor piezoresistive, a MEMS, and/or any other appropriate type of pressure sensor known in the art.

Controller 38 may embody a general machine microprocessor capable of controlling numerous machine functions. Controller 38 may include a memory, a secondary storage device, a processor, and any other components for running an application. Various other circuits may be associated with controller 38, such as power supply circuitry, signal conditioning circuitry, data acquisition circuitry, signal output circuitry, signal amplification circuitry, and other types of circuitry known in the art. It is contemplated that control system 32 may include multiple controllers 38.

Controller 38 may be configured to control one or more components of machine 10 in order to regenerate filtering device 30. Controller 38 may effect a regeneration by, for example, activating combustion device 28. Regeneration of filtering device 30 may triggered on a periodic basis, when a pressure differential across filtering device 30 has exceeded a given threshold, and/or using any other appropriate triggering condition. It is contemplated that controller 38 may additionally control power source 12 such that the exhaust temperature increases (e.g., by increasing the load on power source 12) in order to help regenerate filtering device 30.

Controller 38 may be configured to modify an operating condition of power source 12 such that combustion device 28 has sufficient air to achieve a desired combustion temperature for regeneration of filtering device 30. Controller 38 may include one or more maps, equations, or tables that can be used to determine parameters indicative of whether combustion device 28 is being supplied with sufficient air and fuel to achieve a desired combustion temperature. For example, controller 38 may calculate an equivalence ratio, ER, to determine if combustion device 28 has sufficient air and fuel. An exemplary equation to determine ER may be:

$$ER = \frac{FA_A}{FA_S} \quad (1)$$

where $FA_A$ is the actual or impending fuel air ratio at combustion device 28 and $FA_S$ is the fuel air ratio required for stoichiometric combustion ($FA_S$ may be a predetermined constant). It is also contemplated that controller 38 may calculate a lambda value, where lambda is the inverse of ER.

To determine the $FA_A$ for combustion device 28, controller 38 may calculate the amount of injected fuel required to heat filtering device 30 to a desired regeneration temperature. Determining the amount of injected fuel required to reach a desired regeneration temperature may be based on a table, an equation, or other methods well known in the art. The desired regeneration temperature may be a temperature sufficient to oxidize particulate matter for a given filtering device 30. The desired regeneration temperature may range, for example, from 500 to 700 degrees C.

Controller 38 may then determine the air provided to combustion device 28. Controller 38 may calculate the air provided to combustion device 28 based on the measured pressure of first sensor 40, the measured pressures at second and third sensors 42 and 44, and/or a position of valve 31. The provided air may be calculated based on the pressure difference between the sensors, a known head loss in the passageways, and the position of valve 31. The provided air may also be calculated using other methods well known in the art. Controller 38 may divide the required fuel by the provided air to determine $FA_A$. The ER may then be calculated by dividing $FA_A$ by $FA_S$.

To ensure that combustion device 28 has sufficient air for combustion, controller 38 may seek to maintain the ER of combustion device 28 below a maximum value or upper threshold ($ER_{max}$). $ER_{max}$ may have a value of approximately 2.5. Controller 38 may control several operating conditions of power source 12 to modify the ER. For example, controller 38 may control a parasitic load on power source 12 (via control of parasitic device 13) to modify the ER. If parasitic device 13 embodies, for example, a hydraulic fan, controller 38 may increase the parasitic load on power source 12 by commanding the hydraulic fan rotate at a higher rate. Similarly, if parasitic device 13 embodies a hydraulic pump, controller 38 may increase the parasitic load on power source 12 by commanding the hydraulic pump to produce a higher flow rate and/or pressure. Similar relationships between a required output of parasitic device 13 and an associated power source load may exist for other types of parasitic devices 13. It is contemplated that increasing the parasitic load on power source 12 may modify the exhaust flow exiting power source 12, resulting in an increased amount of air compressed by compressor 26. Increasing the amount of air compressed by compressor 26 may increase the air available to pass through passageway 29 to combustion device 28 (i.e., may decrease the ER). Each parasitic device 13 may have a maximum parasitic load that it may produce. The maximum parasitic load may be, for example, the maximum operating setting for parasitic device 13 (e.g., maximum speed of a hydraulic fan, maximum flow rate of a hydraulic pump, etc.). It is contemplated that multiple parasitic devices 13 may be used in combination, thus increasing the total load on power source 12.

Controller 38 may additionally or alternatively control a speed of power source 12 to affect the ER. Controller 38 may control the speed of power source 12 by adjusting the quantity of fuel injected into combustion chambers 18, the pressure of the injected fuel and air in combustion chambers 18, the timing of fuel injection for power source 12, the power source ignition timing, and/or any other appropriate parameter known in the art. It is contemplated that increasing the speed of power source 12 may increase the amount of exhaust exiting power source 12, thus increasing the amount of air compressed by compressor 26 and increasing the air available to pass through passageway 29 to combustion device 28 (i.e., decreasing the ER).

Controller 38 may modify the operating conditions of power source 12, such as power source speed and/or power source load, until the ER falls below $ER_{max}$, thus helping ensure that combustion device 28 has sufficient air for combustion.

It should also be noted that controller 38 may also seek to prevent excess input air by adjusting valve 31 or by modifying an operating condition of power source 12 such that the equivalence ratio does not fall below minimum desired equivalence ratio or lower threshold ($ER_{min}$). $ER_{min}$, may have a value of approximately 0.5.

$ER_{max}$ and $ER_{min}$ may be constant or may vary as a function of other parameters, such as, for example, flame stability, flame length, combustion efficiency, power source speed, and power source load. Standard testing may be used to determine the variation of $ER_{max}$ and $ER_{min}$ with the flame stability, flame length, combustion efficiency, power source speed, and power source load for a particular machine 10 or configuration of machine 10.

In an alternative embodiment, controller 38 may calculate a combustion air sufficiency parameter in place of or in addition to the ER in order to determine if combustion device 28 has sufficient air to achieve a desired combustion temperature. An exemplary equation to determine the combustion air sufficiency parameter X may be:

$$X = \frac{P_1 - P_2}{\dot{m}} \quad (2)$$

where $P_1$ is the pressure of the air downstream of compressor 26, $P_2$ is the pressure of the flow of exhaust, and $\dot{m}$ is the mass flow rate of the exhaust. $P_1$ may be measured by first sensor 40. $P_2$ may be determined using measurements from second sensor 42 and/or third sensor 44. $\dot{m}$ may be calculated using power source parameters or using a flow sensor (not shown). Controller 38 may modify the operating conditions of power source 12, such as power source speed and/or power source load, until the calculated X falls within a desired range of combustion air sufficiency values. Once the X falls within the desired range, controller 38 may commence regeneration of filtering device 30.

INDUSTRIAL APPLICABILITY

The disclosed emissions control system may be applicable to any machine that utilizes a combustion device for regeneration of a filtering device. The disclosed emissions control system may help ensure that the combustion device has sufficient air to achieve a desired combustion temperature. Operation of the disclosed emissions control system will now be described.

Referring to FIG. 1, in an exemplary operation, atmospheric air may be drawn into intake passageway 20 to compressor 26, where it may be pressurized before entering intake manifold 19. Fuel may be mixed with the pressurized air and the fuel-air mixture may be combusted in combustion chambers 18 to produce mechanical work and an exhaust flow containing gaseous compounds and solid particulate matter. At least some of the mechanical work may be used to power a parasitic device 13. The flow of exhaust from power source 12 may be directed to turbine 24. The hot exhaust gases may cause turbine 24 to rotate, thereby rotating compressor 26 and compressing the inlet air. After exiting turbine 24, the exhaust flow may be filtered by filtering device 30 to remove particulate matter and other exhaust constituents prior to the exhaust being released into the atmosphere.

Figure 2:
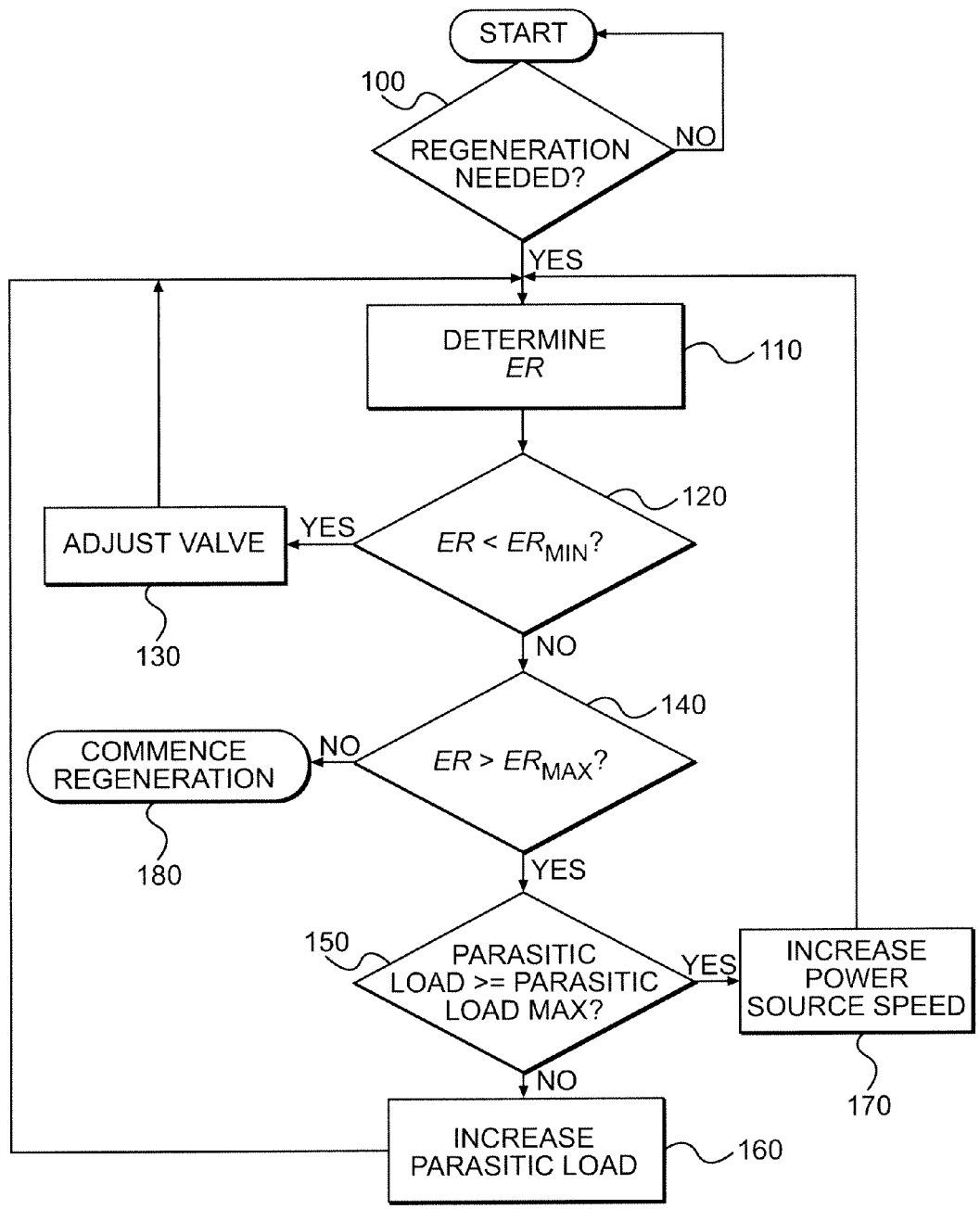
FIG. 2 is a flowchart depicting an exemplary method that may be performed by the emissions control system of FIG. 1.

During operation of machine 10, filtering device 30 may become clogged. As shown in FIG. 2, controller 38 may determine if regeneration of the filtering device 30 is required (step 100). Controller 38 may determine that regeneration is required by sensing if a pressure drop across filtering device 30 has exceeded a maximum pressure drop (as measured by second sensor 42 and third sensor 44). If regeneration is not needed, then controller 38 may wait a predetermined time before checking again whether a regeneration of filtering device 30 is needed.

If regeneration is needed, controller 38 may then calculate the ER at combustion device 28 (step 110). Controller 38 may calculate the ER at combustion device 28 by determining the amount of injected fuel required to heat filtering device 30 to a desired regeneration temperature (e.g., between 500 to 700 degrees C.). Controller 38 may then determine the air provided to combustion device 28. Controller 38 may divide the required fuel by the provided air to determine $FA_A$, which controller 38 may divide by $FA_S$ to determine the ER (see Equation 1).

To help ensure that combustion device 28 does not have an excess amount of air, controller 38 may determine if the ER is less than $ER_{min}$ (step 120). If the ER is less than $ER_{min}$, controller 38 may adjust valve 31 to restrict the air flow through passageway 29 to combustion device 28 (step 130). After adjusting, controller 38 may then return to step 110. If at step 120, the ER is greater than $ER_{min}$, controller 38 may then determine if combustion device 28 has sufficient air to achieve the desired combustion temperature.

To ensure that combustion device 28 has sufficient air to achieve a desired combustion temperature, controller 38 may determine if the ER is greater than $ER_{max}$ (step 140). In the exemplary operation, power source 12 may be running at a low idle speed and the ER may be greater than $ER_{max}$. If the ER is greater than $ER_{max}$, controller 38 may then determine if the current parasitic load is greater than or equal to the maximum parasitic load (step 150). The current parasitic load may be created by operation of parasitic device 13. If the current parasitic load on power source 12 is below the maximum parasitic load, controller 38 may increase the parasitic load (step 160). Controller 38 may increase the parasitic load on power source 12 by modifying the operation of parasitic device 13.

For example, parasitic device 13 may be a hydraulic fan. Controller 38 may communicate with the hydraulic fan, and based on the rotational speed of the hydraulic fan, controller 38 may determine if the parasitic load on power source 12 imposed by the hydraulic fan is above a maximum parasitic load (the maximum parasitic load may be, for example, the maximum rated rotational speed for the hydraulic fan). If below the maximum parasitic load, controller 38 may then command the hydraulic fan to rotate at a higher rate. After increasing the parasitic load, controller 38 may then return to step 110.

If the parasitic load is above the maximum parasitic load, controller 38 may increase the speed of power source 12 (step 170). Controller 38 may control the speed of power source 12 by adjusting the quantity of fuel injected into combustion chambers 18, the pressure of the injected fuel and air in combustion chambers 18, the timing of fuel injection for power source 12, the power source ignition timing, and/or any other appropriate parameter known in the art. Controller 38 may then return to step 110. At step 140 (after passing through steps 110 and 120), if controller 38 determines that the ER is less than $ER_{max}$, controller 38 may commence regeneration (step 180). In other words, controller 38 may commence regeneration (step 180) when regeneration is needed (step 100="Yes") and the ER is greater than $ER_{min}$, (step 120="No") but less than $ER_{max}$ (step 140="No"). It is also contemplated that controller 38 may seek to maintain ER below $ER_{max}$ without seeking to maintain ER above $ER_{min}$. The operation described in FIG. 2 may be repeated throughout the regeneration process to ensure that the ER is maintained below $ER_{max}$ and/or above $ER_{min}$.

Figure 3:
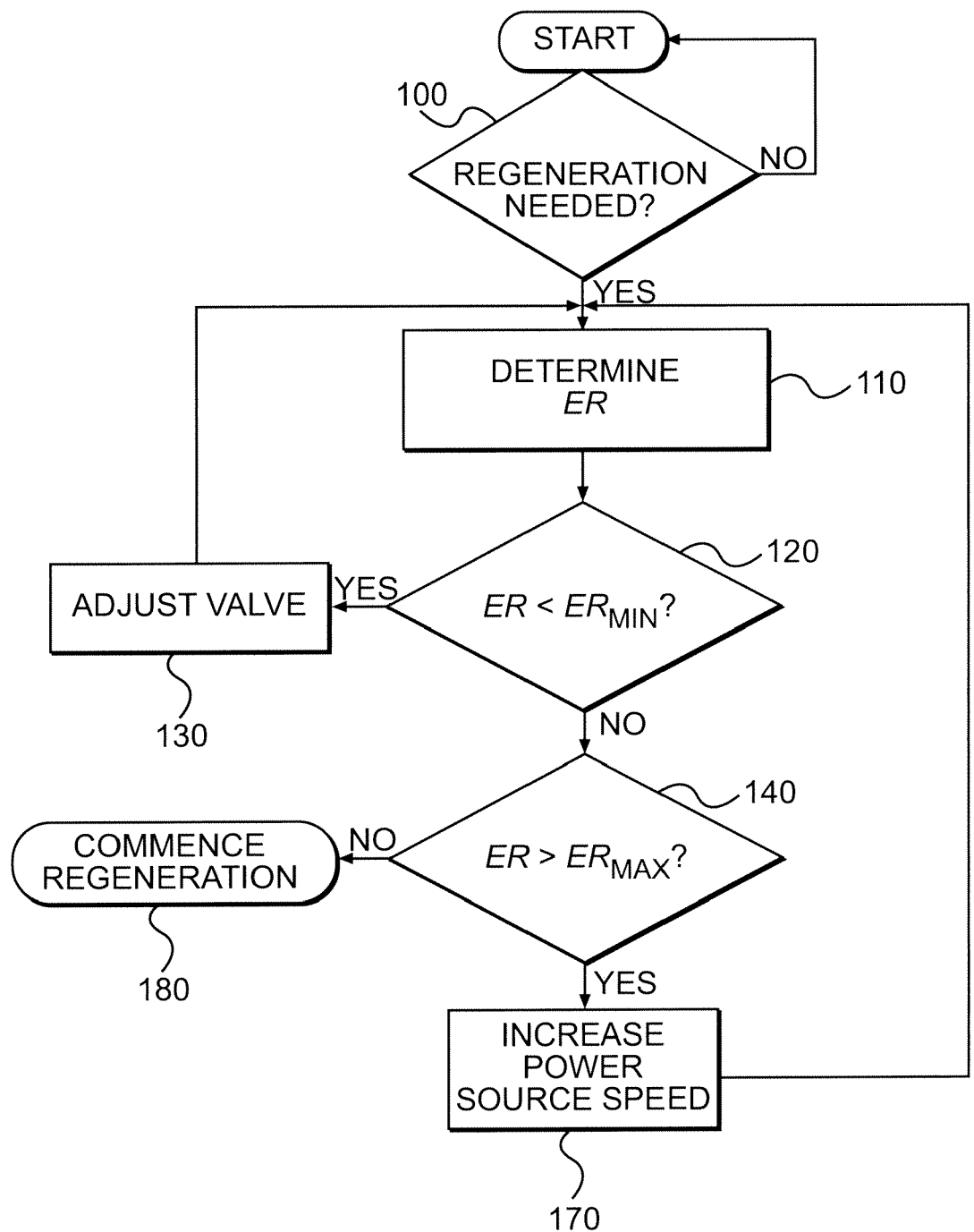
FIG. 3 is a flowchart depicting another exemplary method that may be performed by the emissions control system of FIG. 1.

FIG. 3, may describe another exemplary operation of the disclosed emissions control system. The operation described in FIG. 3 may be substantially the same as the operation described in FIG. 2, except steps 150 and 160 may be omitted. In other words, controller 38 may only modify the power source speed and valve 31 in order to adjust the ER.

Several advantages of the disclosed emissions control system may be realized. For example, the disclosed emissions control system may help ensure that the combustion device has sufficient air to achieve a desired combustion temperature. In addition, the disclosed emissions control system may help ensure that the combustion device is not supplied with too much air. The disclosed emissions control system may also perform well without additional components to increase the air provided to the combustion device, such as pumps or compressors.

It will be apparent to those skilled in the art that various modifications and variations can be made to the disclosed emissions control system. Other embodiments will be apparent to those skilled in the art from consideration of the specification and practice of the disclosed emissions control system. It is intended that the specification and examples be considered as exemplary only, with a true scope being indicated by the following claims.

What is claimed is:

1. An emissions control system having a filtering device, the emissions control system comprising:
   a first passageway configured to receive an exhaust flow from a power source;
   a second passageway having an input in fluid communication with air compressed by a turbocharger;
   a combustion device configured to heat the exhaust flow in the first passageway, the combustion device being configured to receive air from the second passageway; and
   a controller configured to:
      calculate if a parameter is above a threshold, the parameter being indicative of an amount of air provided to the combustion device; and
      modify a parasitic load on the power source if the parameter is above the threshold to increase the amount of air provided to the combustion device, wherein the controller is configured to modify the parasitic load until the parasitic load exceeds a threshold parasitic load and then increase the speed of the power source.

2. The emissions control system of claim 1, wherein the turbocharger is connected to the first passageway and the second passageway.

3. The emissions control system of claim 1, wherein the parameter is at least one of an equivalence ratio or a combustion air sufficiency.

4. The emissions control system of claim 3, wherein the threshold for the equivalence ratio has a value of approximately 2.5.

5. The emissions control system of claim 4, wherein the threshold is an upper threshold, and further including a valve configured to restrict the air received by the combustion device, wherein the controller restricts the air if the equivalence ratio is below a lower threshold of approximately 0.5.

6. The emissions control system of claim 1, the combustion device being configured to regenerate the filtering device when the parameter is below the threshold.

7. A method of regenerating a filtering device, the method comprising:
creating a flow of exhaust with a power source;
providing air to a combustion device configured to heat the flow of exhaust after the flow of exhaust has exited the power source;
determining if a parameter is above a threshold, the parameter being indicative of an amount of air provided to the combustion device; and
if the parameter is above the threshold, modifying with a controller a parasitic load of the power source until the parasitic load exceeds a threshold parasitic load and then increasing the speed of the power source.

8. The method of claim 7, wherein the speed of the power source to affects the parameter.

9. The method of claim 8, wherein the parameter is an equivalence ratio.

10. The method of claim 9, wherein the threshold for the equivalence ratio has a value of approximately 2.5.

11. The method of claim 10, wherein the threshold is an upper threshold, and further including restricting the input air if the equivalence ratio is below a lower threshold of approximately 0.5.

12. The method of claim 8, further including regenerating the filtering device when the parameter is below the threshold.

13. The method of claim 8, further including compressing the air prior to providing the air, wherein an increase in the speed of the power source or the parasitic load results in an increased compression of the air.

14. The method of claim 8, wherein the threshold parasitic load is set at a maximum operating setting for a parasitic device producing the parasitic load.

15. The method of claim 8, wherein the parameter is a combustion air sufficiency.

16. A method of regenerating a filtering device, the method comprising:
driving a turbocharger to compress air with a flow of exhaust generated by a power source;
providing air compressed by the turbocharger to a combustion device configured to heat the flow of exhaust;
determining if a parameter is within a range of acceptable values, the parameter being indicative of an amount of air provided to the combustion device; and
modifying a parasitic load on the power source, if the parameter is above the range, to increase the air compressed by the turbocharger and increase the amount of air provided to the combustion device, wherein modifying the parasitic load includes modifying the parasitic load until the parasitic load exceeds a threshold parasitic load and then increasing the speed of the power source.

17. The method of claim 16, wherein increasing the speed of the power source increases the air compressed by the turbocharger and increases the amount of air provided to the combustion device.

18. The method of claim 17, wherein the parameter is at least one of an equivalence ratio or a combustion air sufficiency.

* * * * *